Nov. 18, 1958 R. A. HENLE ET AL 2,861,200

TRIGGER CIRCUITS EMPLOYING JUNCTION TRANSISTORS

Filed Sept. 30, 1954 3 Sheets-Sheet 1

INVENTORS
ROBERT A. HENLE
RAYMOND W. EMERY
GEORGE D. BRUCE
OLIN L. MAC SORLEY

BY P. E. Henninger

ATTORNEY

Nov. 18, 1958 R. A. HENLE ET AL 2,861,200

TRIGGER CIRCUITS EMPLOYING JUNCTION TRANSISTORS

Filed Sept. 30, 1954 3 Sheets-Sheet 2

INVENTORS
ROBERT A. HENLE
RAYMOND W. EMERY
GEORGE D. BRUCE
OLIN L. MAC SORLEY

BY P. E. Henninger
ATTORNEY

TRIGGER CIRCUITS EMPLOYING JUNCTION TRANSISTORS

Filed Sept. 30, 1954

INVENTORS
ROBERT A. HENLE
RAYMOND W. EMERY
GEORGE D. BRUCE
OLIN L. MAC SORLEY
BY
P. E. Henninger
ATTORNEY

United States Patent Office 2,861,200

Patented Nov. 18, 1958

2,861,200

TRIGGER CIRCUITS EMPLOYING JUNCTION TRANSISTORS

Robert A. Henle, Hyde Park, Raymond W. Emery, Poughkeepsie, George D. Bruce, Wappinger Falls, and Olin L. Mac Sorley, Poughkeepsie, N. Y., assignors to International Business Machines Corporation, New York, N. Y., a corporation of New York Application September 30, 1954, Serial No. 459,381

14 Claims. (Cl. 307—88.5)

This invention relates to trigger circuits, and especially to bistable trigger circuits employing junction transistors.

A bistable trigger circuit may be defined as a circuit with two stable output states which are characterized by separated values of electrical conditions, the circuit being switched back and forth between its two output states by input impulses. The term "bistable trigger circuit" is a generic term including specific types of trigger circuits, such as latch circuits, binary trigger circuits, and double-ended trigger circuits. A latch circuit is one having two sets of input terminals. When an input impulse is received at one set of terminals, one of the output states of the circuit is established and is retained until a signal is received at the other set of input terminals. A binary trigger circuit is one having a single set of input terminals and is switched back and forth between its two output states by successive input impulses of the same polarity. A double-ended trigged circuit, such as an Eccles-Jordan trigger circuit, has a single set of input terminals and two sets of output terminals. When successive input impulses of the same polarity are received in such a circuit, one set of output terminals is switched between two stable states with one order of polarity between the two states, while the second set of output terminals is switched between corresponding states, but with the opposite order of polarity.

Trigger circuits have been proposed using junction transistors. Such circuits have previously been limited with respect to the maximum input signal pulse frequency which they could handle.

It is an object of the present invention to provide an improved trigger circuit employing junction transistors.

A further object is to provide such a circuit which is operable at higher signal pulse frequencies than previous circuits of that type.

A further object of the invention is to provide a circuit which is adaptable with minor modifications for use as a trigger circuit of various types, e. g. as a latch circuit, a binary circuit, or an Eccles-Jordan type of trigger circuit.

The foregoing objects are attained by providing a circuit which comprises two junction transistors having a common connection between their emitters. Cross-coupling connections are provided between each transistor base and the collector of the other transistor, each said connection comprising a resistor and a capacitor in parallel. A conventional load circuit and clamp circuit are connected to the collector of each transistor. Means are provided for biasing each transistor base in a sense to maintain the transistor cut off. In a typical circuit, a single set of input terminals is provided, one of the input terminals being connected to the two emitters, and the other being connected through separate gating connections to the two bases. Each of the separate gating connections includes a diode and a capacitor in series, and a resistor connecting the junction of the diode and capacitor with the collector of one of the two transistors.

The connections between the respective bases and the opposite collectors are effective when one transistor is "off" to transmit to the base of the other transistor a potential effective to overcome the biasing means and hold the other transistor "on." The gating connections perform two functions. First, they establish on the capacitor in series with the base of the "on" transistor a charge having a polarity effective to aid the next input signal to turn that transistor "off." At the same time, the gating connections hold the capacitor in series with the base of the "off" transistor substantially discharged. Second, the gating connections differentially bias their two diodes so as to block the next input signal from the base of the "off" transistor. Under these circumstances, when a signal is applied to the input terminals, the base potential of the "on" transistor is shifted in a sense to turn it "off," thereby producing a signal at its collector which is transmitted through the cross-coupling means to the base of the other transistor and is there effective to turn it "on."

Other objects and advantages of the invention will become apparent from a consideration of the following specification and claims, taken together with the accompanying drawings.

Figure 1:
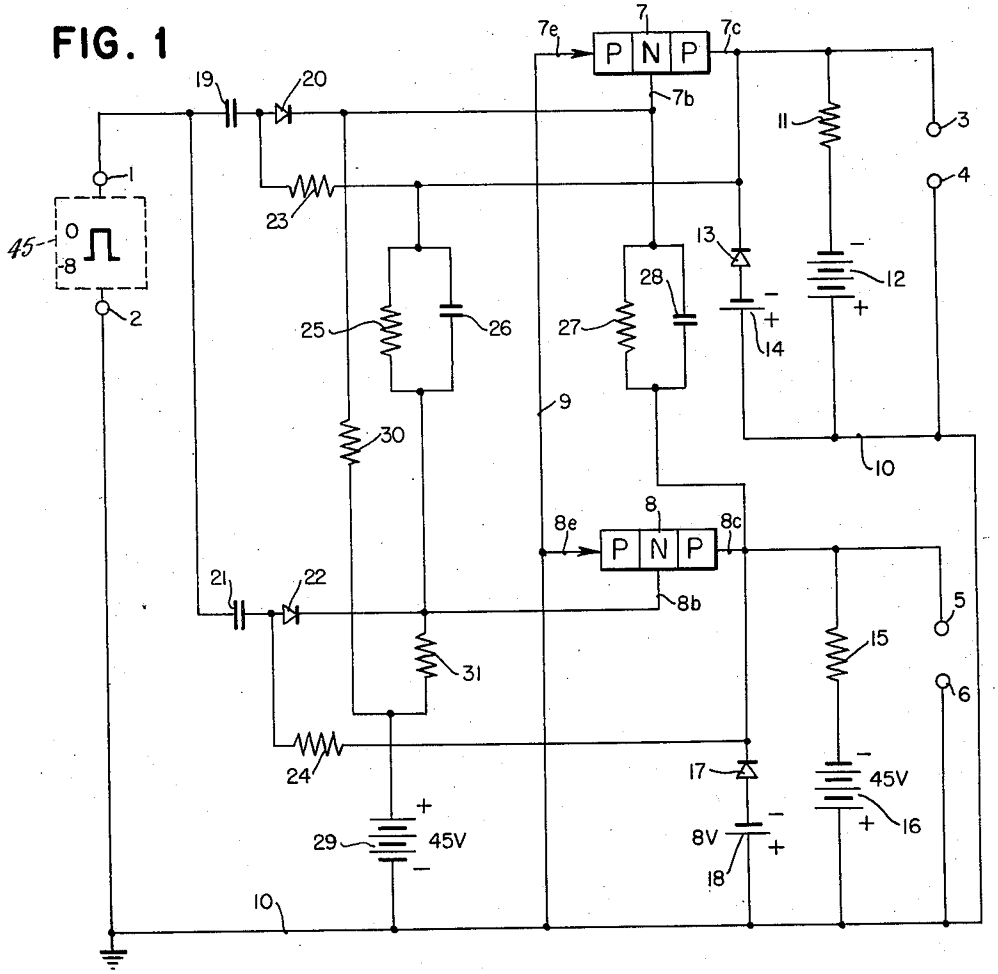
Fig. 1 is a wiring diagram of a trigger circuit embodying the invention.

*Fig. 1*

This circuit has a single set of input terminals 1 and 2 and two sets of output terminals 3, 4, and 5, 6. Two transistors 7 and 8 are provided having emitter electrodes **7*e* and 8*e*, base electrodes 7*b* and 8*b*, and collector electrodes 7*c* and 8*c***.

The emitter electrodes **7*e* and 8*e* are connected directly by a wire 9 which is in turn connected to a grounded wire 10. Collector 7*c* is connected through a load resistor 11 and a battery 12 to the grounded wire 10. Clamping means including a diode 13 and a battery 14 are also connected between collector 7*c* and grounded wire 10**.

In a similar manner, the collector **8*c* is connected through a load resistor 15 and a battery 16 to the wire 10, and clamping means including a diode 17 and battery 18 are connected in a parallel branch circuit. The output electrodes 4 and 6 are connected to the grounded wire 10, and output electrodes 3 and 5 are respectively connected to the collector electrodes 7*c* and 8*c***.

Input terminal 2 is connected to grounded wire 10. Input terminal 1 is connected through a gating connection including a capacitor 19 and a diode 20 to the base electrode **7*b*. The junction of capacitor 19 and diode 20 is connected through a resistor 23 to the collector electrode 7*c*. Input terminal 1 is also connected through a gating connection including a capacitor 21 and a diode 22 to the base electrode 8*b*. The junction of capacitor 21 and diode 22 is similarly connected through a resistor 24 to the collector electrode 8*c***.

Collector electrode **7*c* is cross-coupled through a resistor 25 and parallel capacitor 26 to the base electrode 8*b*. Collector electrode 8*c* is similarly cross-coupled through a resistor 27 and a parallel capacitor 28 to the base electrode 7*b***.

Biasing means for the two base electrodes **7*b* and 8*b* is provided, comprising a battery 29 having its negative terminal connected to ground wire 10. A resistor 30 is connected between the positive terminal of battery 29 and base 7*b*, and a resistor 31 is connected between the positive terminal of battery 29 and base electrode 8*b***.

Connected between input terminals 1 and 2 is a signal generator 45, having a background or no signal potential of −8 volts and a signal potential of 0 volts.

*Operation of Fig. 1*

The biasing battery 29 and resistors 30 and 31 are selected so that if one only of the two transistors was connected in a circuit by itself, the base electrode would be biased positively with respect to the emitter electrode just sufficiently to hold the transistor cut off. More specifically, each of resistors 30 and 31 is selected as follows. With the base-to-emitter voltage approximately zero (transistor just cut off) the sum of the current flowing through the base electrode and the current flowing through the associated cross-coupling resistor (25 or 27) is determined. Resistors 30 and 31 and battery 29 are then selected to supply that current. This determination and selection are made under the most elevated temperature expected under operating conditions. At lower temperatures, the base may then be biased further off than the optimum. This may, of course, be overcome by using input signals of greater amplitude. A compromise must be reached between the conditions required for driving the circuit at low temperatures and for reliable operation at high temperatures.

When the two transistors are connected as shown, one of the transistors is held off by its base biasing means, so that its collector then assumes a potential determined by the clamping battery associated with its collector electrode. In the present instance, assume that the transistor 8 is held off by the battery 29 and resistor 31. The collector 8c is then clamped at a potential of −8 volts. This potential is transmitted through resistor 27 to base 7b of transistor 7, where it is effective to overcome the biasing potential of battery 29 and resistor 30, and holds the transistor 7 on. Under these conditions, the collector 7c is substantially at ground potential, or 0 volts, being below ground only by the potential drop across the transistor, which is then very low. This potential is transmitted through resistor 23 to the junction between capacitor 19 and diode 20. Input terminal 1 is then at its no signal potential of −8 volts, so that a potential of 8 volts is established across capacitor 19, with its right-hand terminal positive. Base 7b is then at substantially 0 volts, being at a potential between that of the emitter (ground) and the collector (slightly negative). Diode 20 therefore has a very small reverse bias across it.

Referring now to capacitor 21, it may be seen that its right-hand terminal is connected through resistor 24 to collector electrode 8c, which is clamped at −8 volts. Since the left-hand terminal of capacitor 21 is also at −8 volts, being connected to input terminal 1, it may be seen that there is no charge on capacitor 21. Base 8b is slightly positive, as determined by biasing battery 29. Consequently diode 22 has a reverse bias of slightly more than 8 volts across it.

With the foregoing conditions established, assume that a square wave potential is impressed on input terminals 1 and 2 so as to raise the potential of input terminal 1 to ground potential, or 0 volts. This change in the potential of the left-hand terminal of capacitor 19 is transmitted through that capacitor and diode 20 to base 7b, and is effective to swing the base 7b positive and cut off the transistor 7. Note that the input signal potential and the potential across capacitor 19 add with respect to their effect on the base 7b, so that that base is swung substantially positive.

The same signal potential is transmitted through capacitor 21, but it is blocked by the bias potential across diode 22, and consequently has no effect at base 8b. It tends to charge capacitor 21, but this charge is dissipated through resistor 24.

When transistor 7 cuts off, a signal is produced at its collector electrode 7c, which shifts from 0 volts to −8 volts, as determined by the clamping battery 14. This signal is transmitted through resistor 25 and capacitor 26 to base electrode 8b, where it is effective to overcome the biasing potential from battery 29 and resistor 31. The transistor 8 is therefore turned "on." When transistor 7 cuts off, its collector 7c swings negative. The charge on capacitor 19 then starts leaking off through resistor 23. Base 7b is held positive by biasing battery 29 and also by the positive potential from collector 8c, applied through resistor 27 and capacitor 28.

At the end of the input pulse, the input terminal 1 returns to its potential of −8 volts. This is the same potential now existing at the right-hand terminal of capacitor 19, (the latter being tied through resistor 23 to collector 7c, which is clamped at −8 volts) so that capacitor 19 now has no potential across it. On the other hand, capacitor 21 now has its right-hand terminal held at substantially 0 volts, (the potential of collector 8c) so that capacitor 21 then becomes charged with its right-hand terminal positive. The conditions of the two transistors have now been reversed from those originally described, transistor 8 now being "on" and transistor 7 being "off."

A second input pulse impressed across the terminals 1 and 2 will reverse the operation just described, switching the transistor 7 "on" again and turning the transistor 8 "off."

The clamping means at each collector electrode is effective to limit the swing of the collector potential, and hence to shorten the "fall" time between the "on" and "off" conditions of the transistor. The maximum frequency of operation of the circuit is thereby increased. By selecting the clamp potential (which becomes the collector potential when the transistor is "off") equal to the "no signal" input potential, and by making the "signal" input potential equal to ground potential (the collector potential when the transistor is "on"), then the respective collector potentials attain their maximum utility in the gates, from the standpoint of increasing the speed of response of the circuit to input signals. The collectors are connected to the gates through resistors 23 and 24, as explained in detail above, and the potentials applied through those resistors are effective (1) to establish a charge on the capacitor 19 or 21 in series with the base of the "on" transistor, which charge has a polarity effective to aid the next signal in turning that transistor "off"; and (2) to apply a negative bias voltage across the diode 20 or 22 in series with the base of the "off" transistor, which bias voltage has a polarity effective to block the next input signal from the base of the "off" transistor. Note also that if the potentials are selected as explained above, then this bias voltage has a magnitude just great enough to counteract that signal, so that little or nothing of the bias voltage remains to oppose the subsequent charging of the gate capacitor after that "off" transistor turns "on." All these effects further increase the speed of response of the circuit to signals, and thereby increase its maximum frequency of operation.

While the circuit illustrated in Fig. 1 will be recognized as being of the general Eccles-Jordan type, in that it has two sets of output terminals whose polarities shift in opposite directions with each input signal, it will be readily recognized that this can be converted to a similar binary trigger circuit by simply eliminating output terminals 3 and 4. Conversely, it can be converted to an inverting binary trigger circuit by eliminating output terminals 5 and 6.

Figure 2:
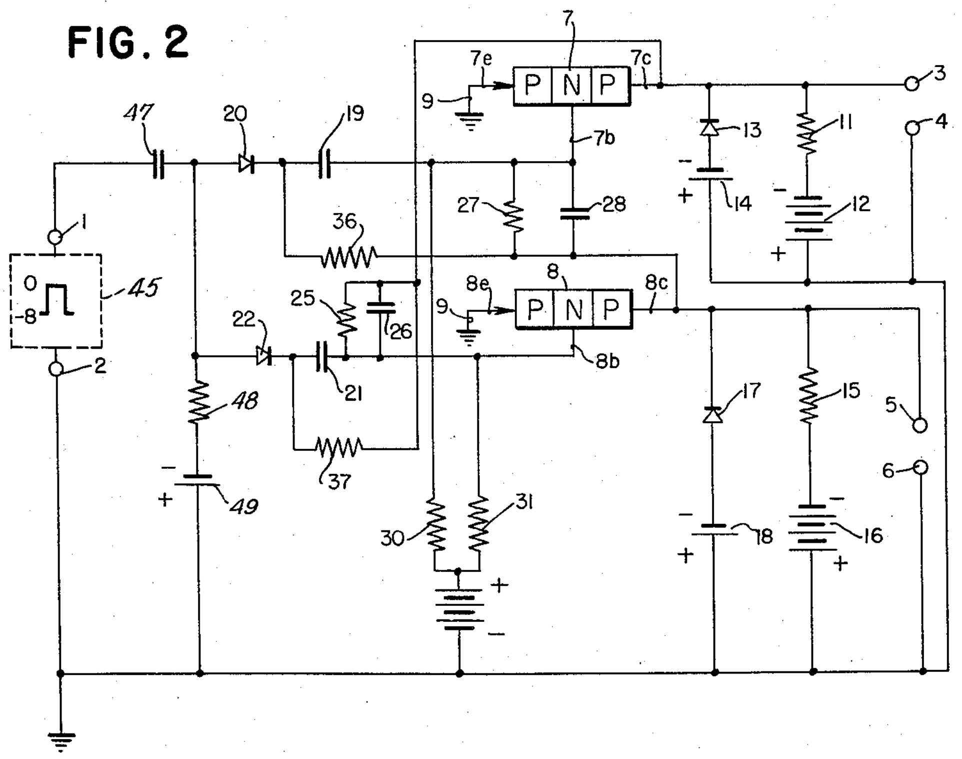
Fig. 2 is a wiring diagram of a modification of the circuit of Fig. 1.

*Fig. 2*

This figure illustrates a modification of the circuit of Fig. 1, in which the relative positions of the diodes 20 and 22 and capacitors 19 and 21 are reversed with respect to the input terminal 1 and the bases 7b and 8b. There is also provided between the input terminal 1 and the diodes 20 and 22 a capacitor 47. A resistor 48 and a battery 49 are connected in series between the right-hand terminal of capacitor 47 and ground.

With this circuit arrangement, the capacitor 47 is discharged under no signal conditions, since both its terminals are at −8 volts. Positive-going signals applied to input terminal 1 are quickly transmitted through the diodes 20 and 22 to switch the trigger circuit back and forth in the manner described in connection with Fig. 1, but negative-going signals are quickly by-passed through resistor 51 and are blocked by the diodes 20 and 22. This arrangement prevents the negative-going signal from having the possible effect of slowing the response of the circuit to the next following positive-going signal, and thereby substantially increases the maximum frequency of input signals to which the circuit may respond.

In Fig. 2 the resistors 23 and 24 of Fig. 1 are replaced by resistors 36 and 37. The resistors 36 and 37 are each connected between the gate connection of one transistor and the collector electrode of the opposite transistor, instead of being connected between the gate and collector of one transistor as in Fig. 1. This modification of the circuit of Fig. 1 is required by the fact that capacitors 19 and 21 are now connected directly to their respective bases **7*b* and 8*b***.

When transistor 7 is "off," its base is biased slightly positive and its collector electrode **7*c* is at a potential of −8 volts. At this time, transistor 8 is "on," its base and collector being slightly negative, i. e. substantially 0 volts. There is thus no charge on capacitor 19, since its terminals are respectively connected to base 7*b* and collector 8*c*, which are both substantially at 0 volts. Diode 20 is biased reversely, since its left-hand terminal is held negative by battery 49, while its right-hand terminal is at ground potential. Capacitor 21 is charged, since its left-hand terminal is connected through resistor 37 to the collector 7*c*, which is at −8 volts, and its right-hand terminal is connected to base 8*b*, which is at a more positive potential (substantially 0 volts). There is no bias on diode 22**, since both its terminals are at −8 volts. It may therefore be seen that the capacitor and diode gates function just as they did in Fig. 1.

Figure 3:
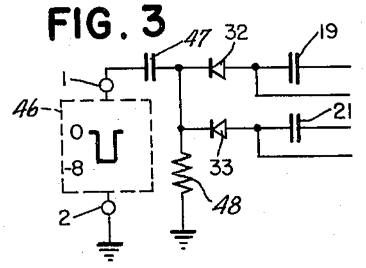
Figs. 3 to 8 are wiring diagrams illustrating further possible modifications of the circuits of Figs. 1 and 2.

*Fig. 3*

The circuit illustrated in this figure is a modification of Fig. 2 intended for use with a negative square wave input signal, as compared to the positive square wave signal used with the circuit of Fig. 2. The diodes 20 and 22 of Fig. 2 are replaced by diodes 49 and 33, of reverse polarity. The battery 32 of Fig. 2 is omitted. Signal generator 45 of Figs. 1 and 2 is replaced by a generator 46 having a "no signal" potential of 0 volts and a "signal" potential of −8 volts. The operation of the two circuits and their structural elements are otherwise the same.

Figure 4:
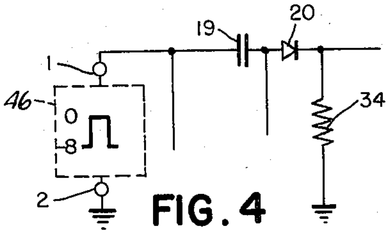

*Fig. 4*

This figure illustrates a modification of the circuit of Fig. 1, including an arrangement which further increases the frequency of response. In this arrangement, a resistor 34 is connected between the right-hand terminal of diode 20 and ground. A similar resistor (not shown) is connected between the corresponding terminal of diode 22 and ground. The function of these resistors is to discharge rapidly the capacitor 19 or 21 in the base circuit of the "off" transistor, thereby enabling it to respond rapidly to a switching signal coming from the "on" transistor through the cross-coupling connection.

Figure 5:
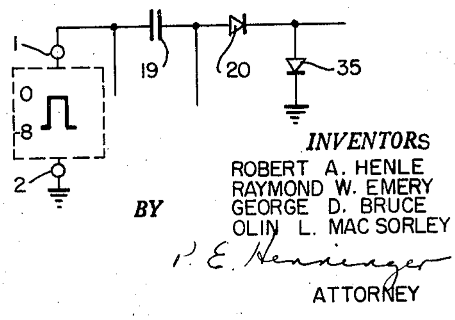

*Fig. 5*

This figure illustrates a circuit for the same purpose as Fig. 4, in which the resistor 34 is replaced by a diode 35. Where the diode 35 is used, the discharge of capacitor 19 is even more rapid. However, the resistance of the resistors 30 and 31 must then be substantially decreased in order to get the same biasing effect from battery 29 as in the circuit of Fig. 1.

Figure 6:
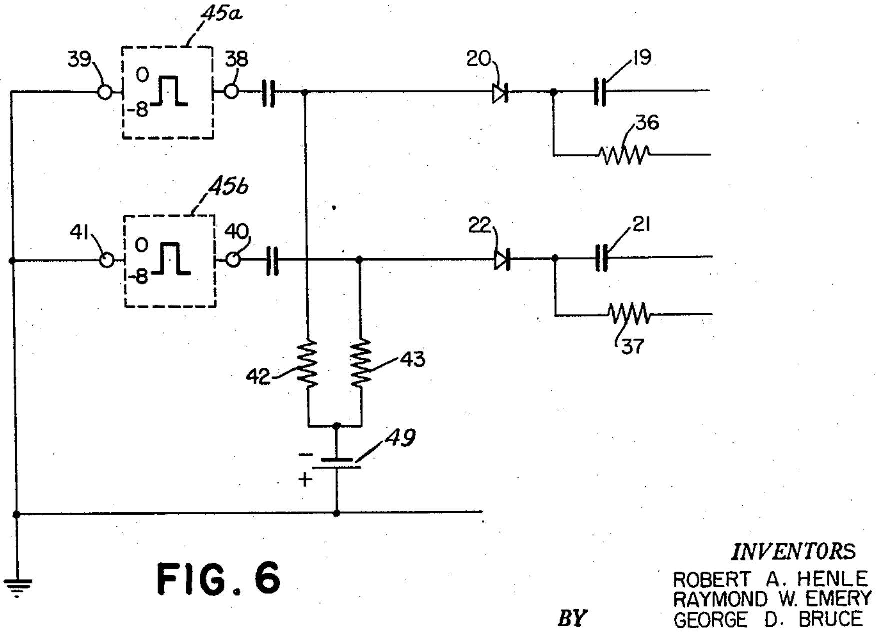

*Fig. 6*

This figure illustrates a modification of the circuit of Fig. 2, which constitutes a latch circuit, in which two sets of input terminals 38, 39 and 40, 41 are employed, supplied with signals by separate signal generators **45*a*, 45*b*. Separate resistors 42 and 43 are provided to replace the single resistor 48** of Fig. 2.

In this arrangement, a signal impressed on input terminals 38 and 39 will turn the transistor 7 "off" and the transistor 8 "on." Any number of further signals at the input terminals 38 and 39 will have no effect on the state of the circuit until a signal is received at input terminals 40 and 41, which signal will turn the transistor 8 off and turn the transistor 7 on. This is typical latch circuit operation.

Figure 7:
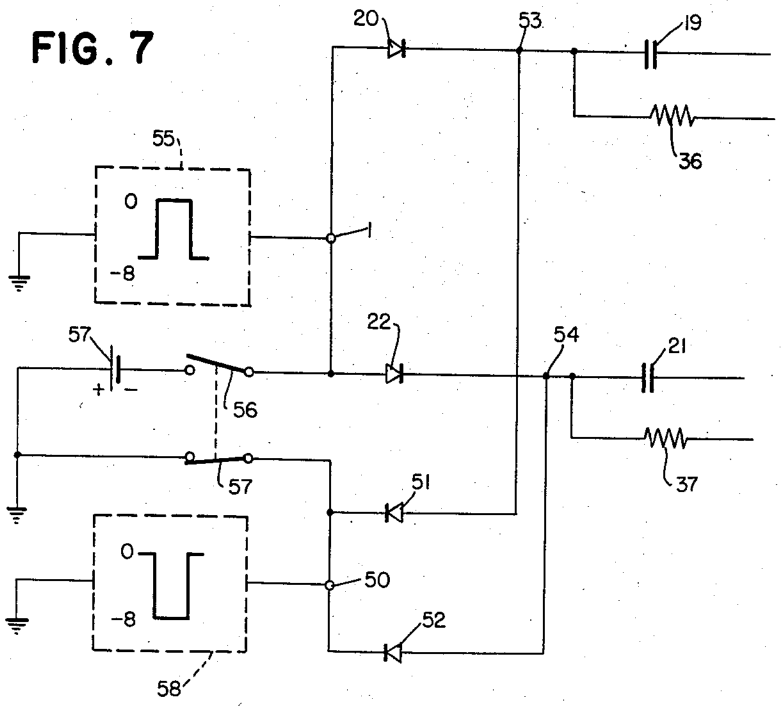

*Fig. 7*

This figure illustrates a modification of the circuit of Fig. 1, in which the relative positions of the diodes 20 and 22 and capacitors 19 and 21 are reversed with respect to the input terminal 1 and the bases **7*b* and 8*b*. To that extent, the circuit of Fig. 7 is similar to that of Fig. 2. In addition, there is provided in Fig. 7 a second input terminal 50, which is connected through diodes 51 and 52 to the junctions 53 and 54, respectively at the opposite terminals of the capacitors 19 and 21 from the bases 7*b* and 8*b*** respectively.

Input terminal 1 is connected to a signal generator 55, which supplies positive-going input signal pulses which vary from a no-signal potential of −8 volts to a signal potential of 0 volts. Input terminal 1 is also connected to a clamp circuit including a switch 56 and a battery 57.

The second input terminal 50 is connected to a signal generator 58 which shifts between a no-signal potential of 0 volts and a signal potential of −8 volts, thereby providing negative-going signal pulses. Also connected to input terminal 50 is a clamp circuit including switch 57 connected to ground.

The switches 56 and 57 are connected for concurrent operation, so that one is open when the other is closed. The switch which is closed clamps its associated input terminal in the "off" condition, whereupon the signals transmitted through the other input terminal are effective to trip the trigger circuit. In this way, the trigger circuit is usable with input signals of either polarity.

Figure 8:
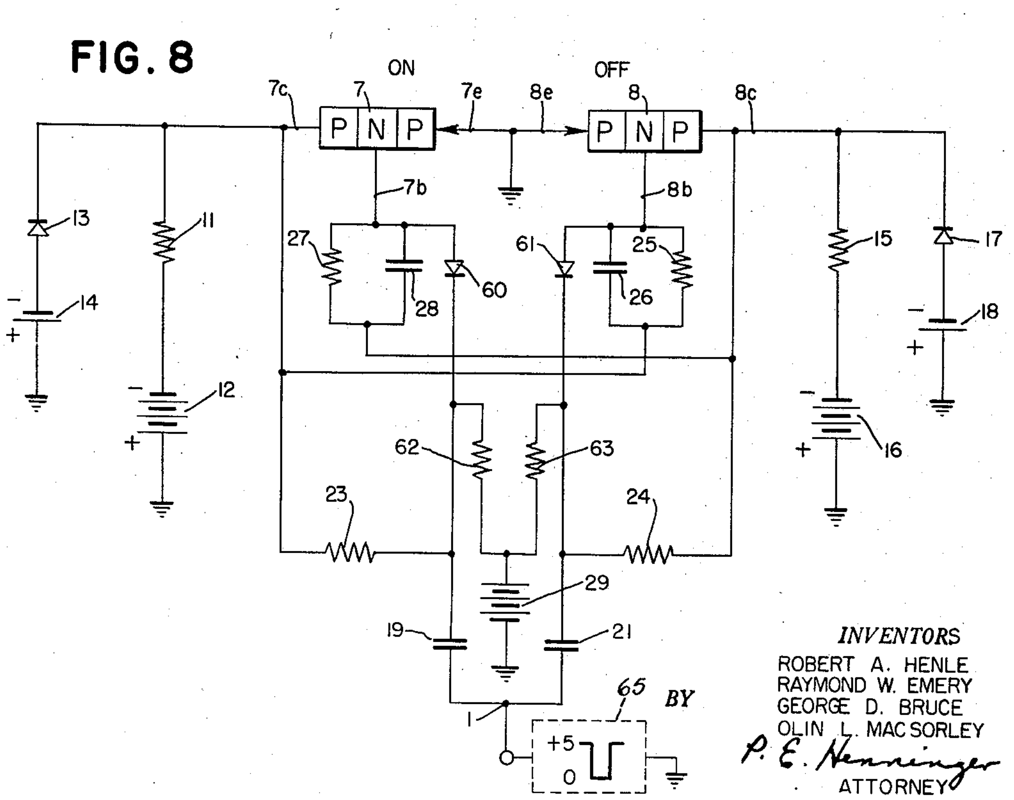

*Fig. 8*

This figure shows still another modification of the circuit of Fig. 1. In this circuit, most of the elements are similar to their counterparts in Fig. 1, and have been given the same reference numerals. Such elements will not be further described.

A principal difference between the circuit of Fig. 8 and that of Fig. 1 is that in Fig. 8 the diodes 20 and 22 are replaced by diodes 60 and 61, whose polarities are opposite with respect to those of diodes 20 and 22. In Fig. 8 also, the resistors 30 and 31 of Fig. 1 are replaced by resistors 62 and 63, which are connected to the base input circuits on the opposite sides of the diodes 60 and 61 from the respective bases.

In the circuit of Fig. 8, a signal generator 65 provides a positive potential of +5 volts at the input terminal 1 as the no-signal potential, and a potential just barely positive at input terminal 1 as the signal potential. The triggers trip when the signal potential shifts from +5 volts to the slightly positive value.

Reviewing briefly the operation of the circuit of Fig. 8, assume that transistor 8 is "off," with collector **8*c* clamped at −5 volts. This potential is transmitted through resistor 27 to base 7*b*, holding transistor 7 "on." Diode 61 is forwardly biased, and diode 60** is reversely biased.

Under these conditions, a negative-going pulse at input terminal 1 is blocked by diode 60, but passes through diode 61 to base **8*b*, turning transistor 8 "on." The positive swing of collector 8*c* is transmitted through resistor 27 and capacitor 28 to base 7*b*, turning transistor 7** "off."

The operation is otherwise analogous to that of the other circuits described above.

The circuit of Fig. 8 has an advantage over the others in that the cross-coupling circuits are less capacitatively loaded (by capacitors 19 and 21) than the other circuits and consequently may operate at somewhat higher frequencies.

While the transistors in the circuits illustrated are PNP junction transistors, it will be readily understood that NPN transistors can be used alternatively, providing only that all the polarities of the batteries are reversed.

The following table shows by way of example particular values for the potentials of the various batteries and for the impedances of the various resistors and capacitors, in circuits which have been operated successfully. In some cases, the values are also shown in the drawing. These values are set forth by way of example only, and the invention is not limited to them nor to any of them. The diodes are considered to have substantially no impedance in their forward direction and substantially infinite impedance in the reverse direction.

*Table I*

| | |
|---|---|
| Resistor **11** | 10K ohms. |
| Battery **12** | 45 volts. |
| Battery **14** | 8 volts. |
| Resistor **15** | 10K ohms. |
| Battery **16** | 45 volts. |
| Battery **18** | 8 volts. |
| Capacitor **19** | 1000 mmf. |
| Capacitor **21** | 1000 mmf. |
| Resistor **23** | 3K ohms. |
| Resistor **24** | 3K ohms. |
| Resistor **25** | 20K ohms. |
| Capacitor **26** | 680 mmf. |
| Resistor **27** | 20K ohms. |
| Capacitor **28** | 680 mmf. |
| Battery **29** | 45 volts. |
| Resistor **30** | 30K ohms. |
| Resistor **31** | 30K ohms. |
| Resistor **34** | 3K ohms. |
| Resistor **36** | 3K ohms. |
| Resistor **37** | 3K ohms. |
| Resistor **42** | 3K ohms. |
| Resistor **43** | 3K ohms. |
| Capacitor **50** | 1500 mmf. |
| Resistor **51** | 3K ohms. |
| Battery **52** | 8 volts. |

While we have shown and described certain specific embodiments of our invention, other modifications thereof will readily occur to those skilled in the art, and we therefore intend our invention to be limited only by the appended claims.

We claim:

1. A trigger circuit comprising two junction transistors, each having an emitter electrode, a base electrode and a collector electrode, means holding both said emitter electrodes at a common fixed potential, means biasing both base electrodes to a potential effective to hold said transistors "off," a pair of cross-coupling means connecting the collector electrode of each transistor to the base electrode of the other transistor, each said cross-coupling means being effective when the transistor of its associated collector electrode is "off" to overcome said biasing means and hold the transistor of its associated base electrode "on," so that one or the other of the transistors is always "on," signal input means; and a pair of gate means, each said gate means comprising a diode, a capacitor in series with the diode between the signal input means and its associated base, and a resistor connected between the common junction of the diode and capacitor and the collector electrode of one of the transistors; said pair of gate means cooperating to charge the capacitor in series with the base of the "on" transistor with a polarity tending to aid the next signal to turn that transistor "off," and to bias the diode in series with the base of the "off" transistor with a polarity tending to block said next signal from the "off" transistor base.

2. A trigger circuit as defined in claim 1, including clamp means connected to each collector electrode and effective to fix the potential thereof when the transistor is "off" at a value substantially equal to the no signal potential of the signal input means.

3. A trigger circuit as defined in claim 2, in which said common fixed potential of the emitter electrodes is substantially equal to the signal potential of the signal input means.

4. A trigger circuit as defined in claim 1, in which, in each of said gate means, the diode is connected between the capacitor and the associated base, and the resistor is connected between the junction of the diode and capacitor and the collector electrode of the same transistor.

5. A trigger circuit as defined in claim 1, in which, in each of said gate means, the capacitor is connected between the diode and the base, and the resistor is connected between the common junction of the diode and capacitor and the collector electrode of the other transistor.

6. A trigger circuit as defined in claim 1, comprising impedance means connected between said base electrodes and ground and effective to discharge the capacitors of said gate means rapidly.

7. A trigger circuit as defined in claim 6, in which said impedance means comprises a pair of resistors, one connected between each base electrode and ground.

8. A binary trigger circuit as defined in claim 6, in which said impedance means comprises a pair of diodes, one connected between each base electrode and ground.

9. A trigger circuit as defined in claim 1, including means coupling said signal input means to said gate means, said coupling means comprising a capacitor connected in series between said input means and said gate means, and a resistor connected between ground and the terminal of the capacitor nearest the gate means.

10. A trigger circuit comprising two junction transistors, each having an emitter electrode, a base electrode and a collector electrode, means connecting both said emitter electrodes directly to ground, a source of unidirectional electrical potential having one terminal connected to ground, means including a pair of resistors connecting the other terminal of said source to the respective base electrodes of the transistors, said source having the proper polarity and supplying a potential of sufficient magnitude to bias both base electrodes to a potential tending to hold said transistors "off," a pair of cross-coupling means connecting the collector electrode of each transistor to the base electrode of the other transistor, each said cross-coupling means being effective when the transistor of its associated collector electrode is "off" to overcome said biasing means and hold the transistor of its associated base electrode "on," so that one or the other of the transistors is always "on," signal input means, and a pair of gate means, each said gate means comprsing a diode and a capacitor in series between the signal input means and its associated base, and a resistor connected between the common junction of the diode and capacitor and the collector electrode of one of the transistors, said pair of gate means cooperating to charge the capacitor in series with the base of the "on" transistor with a polarity tending to aid the next signal to turn that transistor "off," to discharge substantially the capacitor in series with the base of the "off" transistor, and to bias the diode in series with the base of the "off" transistor with a polarity tending to block said next signal from the "off" transistor base.

11. A trigger circuit as defined in claim 10, in which said signal input means includes two independently operable signal generators, each respectively connected to one of said gate means.

12. A trigger circuit as defined in claim 10, in which each said diode is connected to its associated base and is poled in the same direction as the emitter-to-base impedance of its associated transistor, and each said capacitor is connected to said signal input means, said resistor is connected to the collector electrode of said associated transistor, and said signal input means has a positive background potential and a signal potential substantially equal to ground potential.

13. A trigger circuit as defined in claim 1, in which said signal input means includes positive-going signal input means and negative-going signal input means; and said pair of gate means includes means connecting the capacitors in said pair of gate means directly to said base electrodes, and a second diode in each gate, one diode in each gate being poled forwardly to said positive-going signals and connecting the positive-going signal input means to the gate capacitor, and the other diode in each gate being poled forwardly to the negative-going signals and connecting the negative-going signal input means and the gate capacitor; and means for clamping said respective signal input means selectively "off."

14. A trigger circuit as defined in claim 1, in which the diode of each said gate means is connected to its associated base electrode and poled to pass negative-going signals and the capacitor of each said gate means is connected between the diode thereof and said signal input means.

References Cited in the file of this patent

UNITED STATES PATENTS

| | | |
|---|---|---|
| 2,478,683 | Bliss | Aug. 9, 1949 |
| 2,569,345 | Shea | Sept. 25, 1951 |
| 2,644,887 | Wolfe | July 7, 1953 |
| 2,759,104 | Skellett | Aug. 14, 1956 |

OTHER REFERENCES

Electronics, August 1953, page 173.

UNITED STATES PATENT OFFICE

CERTIFICATE OF CORRECTION

Patent No. 2,861,200 November 18, 1958

Robert A. Henle, et al

It is hereby certified that error appears in the printed specification of the above numbered patent requiring correction and that the said Letters Patent should read as corrected below.

Column 1, line 32, for "trigged" read -- trigger --; column 4, line 40, strike out the numeral "5"; column 5, line 11, for "resistor 51" read -- resistor 48 --; line 49, for "diodes 49 and 33" read -- diodes 32 and 33 --; line 50, for "battery 32" read -- battery 49 --.

Signed and sealed this 8th day of September 1959.

(SEAL)

Attest:

KARL H. AXLINE
Attesting Officer

ROBERT C. WATSON
Commissioner of Patents